Patented Feb. 13, 1923.

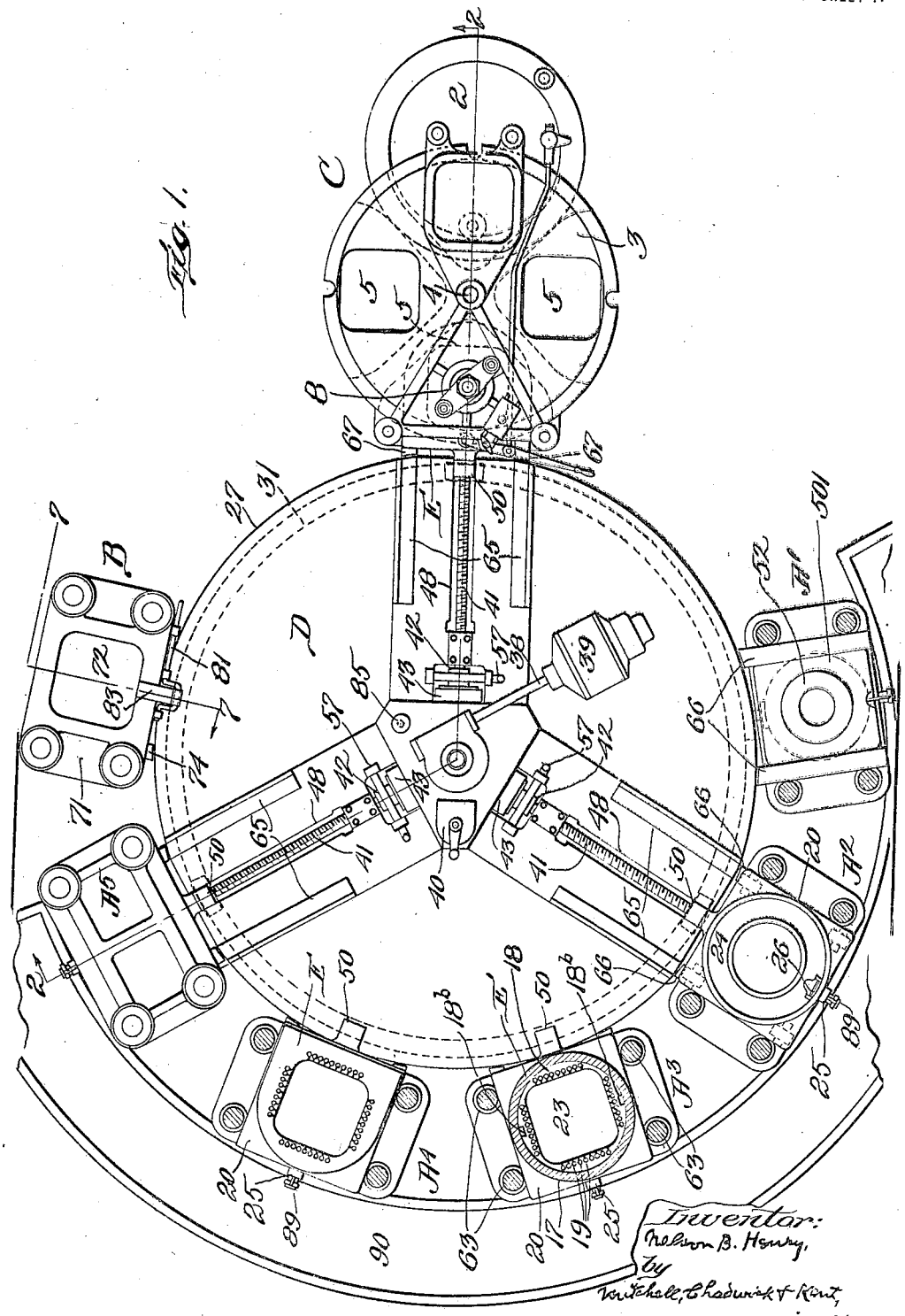

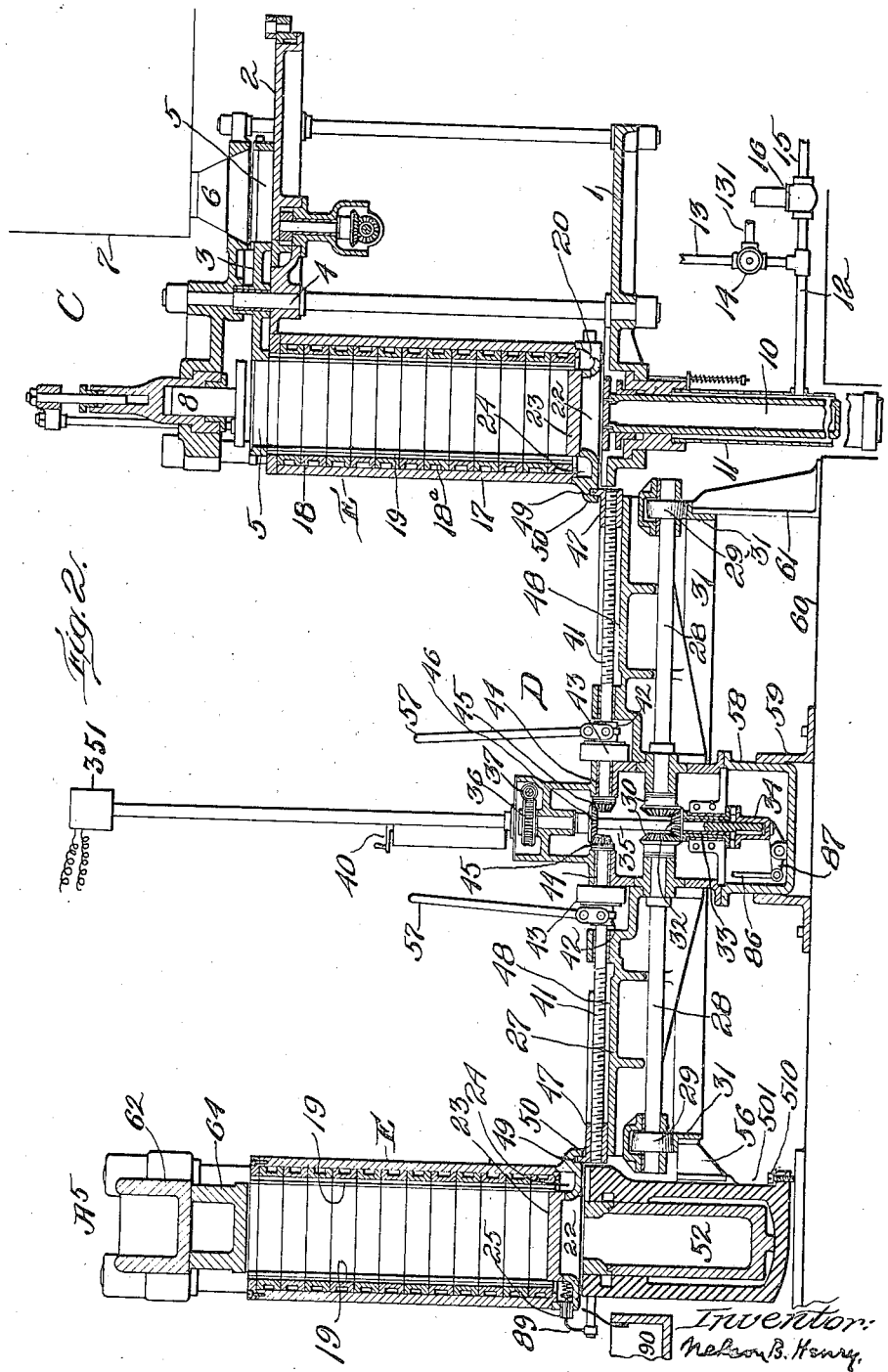

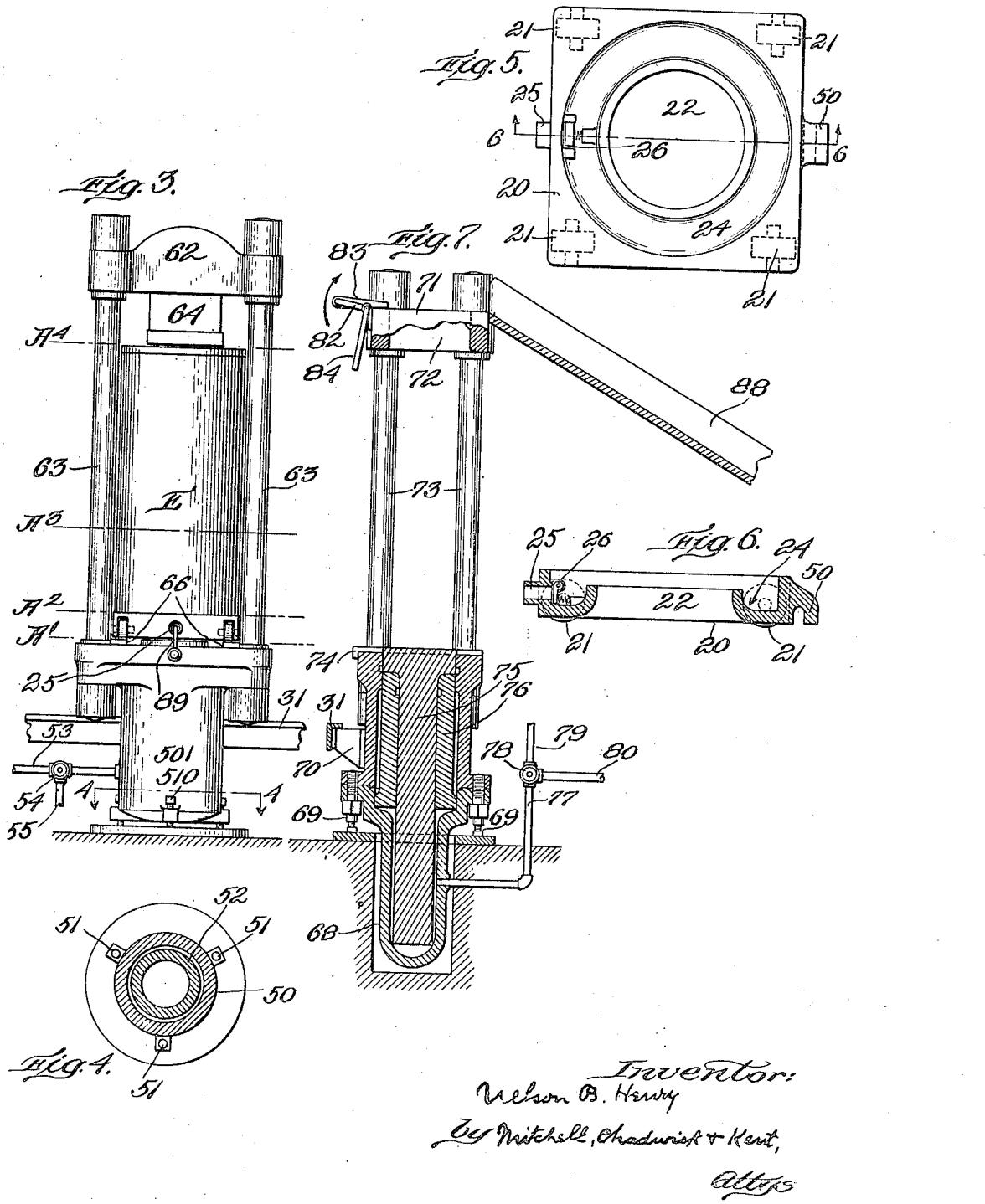

1,445,314

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

APPARATUS FOR OIL EXTRACTION.

Application filed November 3, 1920. Serial No. 421,567.

*To all whom it may concern:*

Be it known that I, NELSON B. HENRY, a citizen of the United States, residing at Atlanta, in the county of Fulton and State of Georgia, have invented certain new and useful Improvements in Apparatus for Oil Extraction, of which the following is a specification.

This invention relates to apparatus for extracting oils from nuts, seeds and other oil bearing materials, and it has for its object to provide an improved apparatus for this purpose which will lessen the expense of extracting oils from materials of the kind referred to, which will reduce to a minimum the amount of manual labor required, and which will secure the greatest possible extraction of oil with the greatest economy of time and effort.

The invention consists of an oil extracting apparatus of the class described having the peculiar features of construction, organization and mode of operation set forth in the following description and particularly pointed out and defined in the claims at the close thereof.

In the accompanying drawings:

Figure 1 is a plan view, partly in section, of an oil extracting apparatus constructed in accordance with my invention.

Figure 2 is a section on line 2—2 of Fig. 1.

Figure 3 is an outer side elevation of one of the extracting presses hereinafter referred to.

Figure 4 is a section on line 4—4 of Fig. 3.

Figure 5 is a plan view of one of the cage trucks hereinafter referred to.

Figure 6 is a section on line 6—6 of Fig. 5.

Figure 7 is a section on line 7—7 of Fig. 1, illustrating the construction of the stripping or unloading press hereinafter referred to.

In Figure 1 the extracting press $A^1$ is shown in section on the line $A^1$ of Figure 3; the press $A^2$ is shown in section on the line $A^2$ of Figure 3, with the cage removed; the press $A^3$ is shown in section on the line $A^3$ of Figure 3; and the press $A^4$ in section on the line $A^4$ of said figure.

I shall describe my invention in connection with cotton seed oil extraction.

The apparatus herein shown comprises a plurality of extracting presses $A^1$, $A^2$, $A^3$, $A^4$, $A^5$; a stripping or unloading press B; cage loading mechanism C; a turntable D, and a set of cages E consisting of seven interchangeable units, two more in number than there are extracting presses $A^1$, etc.

The loading mechanism C, which is the same in construction and mode of operation as the loading mechanism shown and described in my co-pending application, Serial No. 385,405, filed June 1, 1920, comprises a platform 1 adapted to serve as a support for the cages while they are being loaded, and above this platform is arranged a table or bed 2 which supports a rotatable member or disk 3. The member 3 is formed with a number of apertures 5 through it and is intermittently turned on a trunnion 4 so as to bring these apertures successively, first, into position beneath the outlet 6 of a cooker 7 containing a supply of cooked "seed meats" where each aperture is loaded with a charge of the latter, and then into position directly above the upper open end of a cage E standing upon platform 1. During each period of rest of member 3 a ram or plunger 8 is operated to press the "cake" of meats from the aperture 5 that is over the cage downwardly into the latter, successive cakes being thus formed and transferred to the cage until the latter is filled, whereupon the operation of the loading mechanism C is stopped. There are four equidistant apertures 5 provided in member 3 and the latter is moved step-by-step ninety degrees at each step, so that during each period of rest of said member an empty aperture 5 is stopped midway of its travel from the cage E to cooker outlet 6 and while each aperture is at rest at this point a metal plate and sheet of hair cloth, both of the same size and shape as the aperture, are placed within the latter in the order named. Also during each period of rest of member 3 a filled or charged aperture 5 is stopped midway of its travel from cooker outlet 6 to cage E and while at rest at this place a hair cloth sheet and metal plate are placed on top of the material within the aperture in the order named. These hair cloths and plates are forced into the cage E by the ram 8 with the cakes. All this is more in detail described in my application above mentioned, No. 385,405.

It has heretofore been common practice to wrap charges of oil bearing material in cloths, which served to contain the mass and provide numerous minute passages between the fibres of the cloth for the escape of the extruded oil. But this method had two disadvantages, viz, that it was not possible to charge the press with oil bearing material at high temperature and that, if sufficient pressure to get the best oil extraction possible under the conditions was employed, the wrapping cloths were likely to be ruptured at or near the periphery of the forming cake, and as this frequently happened in fact, even at ineffective pressures, the cost was considerable, especially when first quality cloths of horse or human hair were thus destroyed. In my die-formed cake the hair cloths are flat on top and bottom and last indefinitely under any pressure desired.

Each cage E includes in its construction a false bottom 23 which, at the start of the loading operation, is raised to the upper end of the cage and yieldingly supported by a ram 10 forming part of loading mechanism C, said false bottom and ram being forced downwardly step-by-step as successive cakes are shoved into the upper end of the cage by plunger 8. The cylinder 11 within which ram 10 is housed is connected by pipes 12 and 13 with a supply of liquid under head or pressure and in pipe 13 is arranged a three-way valve 14 adopted to be adjusted to admit liquid under pressure into cylinder 11 and raise ram 10 after which said valve is closed and adapted also to open pipe 12 to the exhaust pipe 131, when desired. The pipe 12 has connected with it another pipe 15 within which is arranged a relief valve 16 which yieldingly holds within cylinder 11 the fluid admitted by valve 14 as described. It will therefore be clear that as the cakes are forced into the upper end of the cage the ram 10 yields downwardly but with sufficient resistance to ensure forming and compacting and uniform spreading of the cakes as they are deposited within the cage. That is, when plunger 8 descends to force a cake from member 3 into the cage it meets with resistance from ram 10 and the cake is thereby formed and compacted in the die between the plates and cloths with a predetermined pressure sufficient to cause the liquid in cylinder 11 to escape past the relief valve 16, and the caks to be received into the cage.

Each cage comprises a steel sleeve or cylinder 17 into which are pressed a number of rings 18 having openings of the same size and shape as the die openings 5 of member 3. Through these rings are formed registering channels 19 which are slotted to open into the interior of the cage and which constitute conduits for the oil when the cakes are subjected to expressing pressure.

In the preferred form of cage, which is illustrated in Figs. 1 and 2, the rings 18 are slotted or grooved on the outer surface, at 18ᵃ to form steam passages, for heating purposes. These several annular grooves are connected by a groove or grooves 18ᵇ running crosswise of the annular grooves and registering with a corresponding groove in each adjacent ring, whereby steam may be passed into the spaces 18ᵃ and the cage heated to a desired temperature. The sleeve or cylinder 17 rests at its lower end upon a base consisting of a truck 20 mounted upon wheels or rollers 21, said base truck being made with an opening 22 through it for the passage of the ram 10. Each cage also includes in its construction a false bottom 23 which normally is at the lower end of the cylinder resting upon base truck 20, and which, at the start of the cake forming and cage loading operation is raised to the upper end of the cage and yieldingly supported by ram 10, said false bottom and ram being forced downwardly step-by-step as successive cakes are formed, compacted and shoved into the upper end of the cage. The cage base 20 is made upon its top side with an annular trough or basin 24 with which the lower ends of all of the vertical channels 19 communicate. Communicating with this trough or chamber 24 is an outlet port 25 normally closed by an inwardly opening, spring pressed valve 26.

The turntable D comprises a circular body 27 upon the under side of which are three radially disposed shafts 28 journaled in bearings on said body, each of said shafts having fixed to its outer end a roll or wheel 29 and to its inner end a bevel gear 30. The rollers 29 rest upon a circular track 31 by which the turntable is supported, while the bevel gears 30 mesh with a single bevel gear 32 fast on the upper end of a sleeve 33 journaled in a bearing on body 27 of the turntable. The lower end of sleeve 33 is constructed to constitute a clutch co-operating with a clutch member 34 splined upon the lower end of a vertical shaft 35 journaled within sleeve 33 through which it extends and in a bearing at the top of body 27. At its upper end shaft 35 has fixed thereon a worm gear 36 that is driven by a worm 37 fast on the armature shaft 38 of an electric motor 39. The electric motor 39 is started, stopped, reversed and generally controlled by means of a controller 40 mounted upon the top side of body 27 and connected with motor 39 and a source of electrical energy in any suitable manner. In the drawings I have indicated at 351 a housing carrying the feed wires and suitable brushes for contact with rotating terminals within, which are wired to the motor.

Journaled in bearings upon the top side of body 27 are three radially disposed shafts 41 positioned 120 degrees apart, each of said shafts having splined upon its inner end a clutch member 42 co-operating with another clutch member 43 that is part of a sleeve 44 loosely surrounding the inner end of said shaft 41. At its inner end each sleeve 44 carries a bevel gear 45 in mesh with a bevel gear 46 fast on vertical shaft 35. For a portion of its length each shaft 41 is threaded and upon this threaded portion is mounted a nut 47 that is more or less rectangular in cross-section and occupies a radial groove 48 provided upon the upper side of body 27 within which said nut is slidable toward and from the center of the turntable. Upon its upper side each nut 47 is made with an upstanding lug 49 adapted to co-operate with a depending lug 50 provided on each cage base 20. The grooves 48 are made with flat sides which fit against the flat sides of the nuts 47 and thereby hold said nuts against rotation when shafts 41 are rotated to move said nuts radially inwardly or outwardly on the turntable. The clutch members 42 are moved into and out of engagement with clutch members 43 manually by means of levers 57.

A depending trunnion 58 provided upon the under side of body 27 and rotatably mounted within a bearing 59 secured to the floor 60, serves to hold the turntable against lateral displacement.

As shown in Figures 1, 2, 3 and 4, each extracting press $A^1$, $A^2$, $A^3$, $A^4$, $A^5$, comprises a cylinder 501, whose lower end is closed and provided upon its exterior with three radial feet each having a screw 510 mounted therein, which screws serve to support said cylinder with provision for adjustment as is required in setting up the apparatus. Cylinder 501 contains a ram 52 and is connected by a pipe 53 with a supply of liquid under pressure or head, a three-way valve 54 being provided in pipe 53 for controlling the same and also an exhaust pipe 55. Each cylinder 501 is connected by a bracket 56 with the circular track 31, said bracket being fastened to the cylinder and track by bolts. Standards 61 also assist in supporting the track 31.

Each extracting press $A^1$, etc., includes a head block 62 connected by rods 63 with its cylinder 501 and secured in position against the under side of said head block is an abutment block 64 whose under side is supported above the upper end of its cylinder 501 a distance slightly more than the height of one of the cages E.

Upon its top side the body 27 of turntable D is provided with three pairs of radially disposed rails 65 which are in the same horizontal plane with a pair of rails 66 provided upon the upper end of each cylinder 501 with which the rails on the turntable can be brought into register by rotative adjustment of said turntable. The rails 65 on the turntable extend outwardly to the periphery of the latter while the rails on cylinders 501 extend inwardly as far as said periphery. Therefore, it will be clear that when one of the pairs of rails 65 on the turntable is in register with the rails of one of the extracting presses a cage can be rolled from one pair of rails to the other. The platform 1 of the loading mechanism C is also provided upon its top side with a pair of rails 67, similar to the rails 66 of the extracting presses, upon which rest the wheels of the cage E that is being loaded by the mechanism C.

The unloading press B comprises a cylinder 68, Fig. 7, that is closed at its lower end and provided upon its exterior with screw legs 69 by which it is supported with provision for adjustment, said cylinder also being connected with the rail, 31, by a bracket 70 fastened by bolts to said cylinder and rail. A head block 71 made with an opening 72 through it is provided for press B, said head block being connected with cylinder 68 by rods 73. At its upper end the cylinder 68 is constructed with a pair of rails 74 similar to the rails 66 at the tops of cylinders 501. Within cylinder 68 is arranged a two-part extension ram consisting of a piston 75 and sleeve 76. Connected with the lower end of cylinder 68 is a pipe 77 in which is arranged a three way valve 78 connected by a pipe 79 with a supply of liquid under pressure or head. By means of this valve 78 communication between pipe 77 and pipe 79, as well as between pipe 77 and an exhaust pipe 80, is manually controlled to control and operate the piston 75—76.

Journaled in bearings provided on head block 71 of press B is a shaft 81 formed with a crank 82 to which is pivotally connected one end of a pusher 83. The shaft 81 is provided at one end with a lever arm 84 by means of which it is manually rocked to operate the pusher 83.

Normally the motor 39 is in operation and shaft 35 as well as sleeves 44 are being continuously driven thereby, the clutch members 34 and 42 however, being in their unclutched positions with shafts 28 and 41 at rest and with nuts 47 at the limit of their outward movement. Upon the turntable body 27 is mounted a foot pedal 85 depression of which acts through a rod 86 and lever 87 to lift clutch member 34 into engagement with the lower clutch-end of sleeve 33. This connects the rotating shaft 35 with the wheel shafts 28 through clutch member 34, sleeve 33, and bevel gears 32 and 30, thereby rotating the turntable. When the nuts 47 occupy their outermost positions and the turntable is thus rotated the lugs 49 of said nuts travel a path just inside of the lugs 50 of the cages which are located at presses $A^1$, etc., and unloading mechanism B and loading mechanism C. It will therefore be clear that by stopping the turntable with one of its pairs of rails 65 opposite the pair of rails at any one of these several stations the lug 49 of the nut 47 operating with that pair of turntable rails 65 will occupy a position behind the lug 50 of the cage E at said station. With the two lugs 49' and 50 thus interlocked rotation of the shaft 41 in the proper direction will shift the nut 47 toward the center of the turntable and said nut will pull the cage E with it, transferring said cage from the rails at said station to the rails on the turntable. It will also be clear that the cage can be transferred from the turntable to the rails at any one of said stations by rotation of shaft 41 in the opposite direction. The direction of rotation of the shafts 41 is reversed by reversing the motor 39 through the medium of controller 40.

When a cage is transferred from one of the extracting presses $A^1$, etc., to the unloading press B and placed in position upon the rails 74 of the latter, the operator manipulates valve 78 to admit fluid under pressure to cylinder 68. When pressure is first applied to ram 75—76 through the opening of valve 78 both parts of said ram ascend together and work in conjunction against the false bottom 83 of the cage to force the cakes up through the opening 72 of the head block 71 and as each cake emerges from opening 72 the pusher 83 is manually operated to shove the same off from head 71 into a chute 88 by which the cakes may be delivered onto a table for the removal of the plates and cloths. Inasmuch as there is a plate and cloth on the top and bottom of each cake, it is evident that there will be metal contact between adjacent cakes and therefore the several cakes will readily separate one from another when operated upon by pusher 83. After the ejection of the cakes from the cage has once commenced the pressure required to continue the movement upward of the cakes decreases so that the smaller ram section 75 has capacity to finish the ejecting operation after the larger ram section 76 reaches the limit of its upward movement. This design of unloading ram greatly reduced the length which would be required for a single ram and also reduces the necessary pump capacity by about one-half.

When a freshly loaded cage E is transferred from loading mechanism C to one of the extracting processes $A^1$, etc., and shoved into position within the latter an arm 89, provided on each cylinder 501, enters the port 25 and opens the valve 26 so that any oil that has collected, or later collects within the trough 24, flows out through port 25 from which it discharges into a segmental vat 90 which extends along side of the extracting presses $A^1$, etc. After the cage is placed within one of the presses $A^1$, etc., the operator manipulates the valve 54 thereof to admit fluid under pressure to the cylinder 501 of said press which forces the ram 52 thereof upwardly against the false bottom 23 of the cage E thereby compressing the material within the latter between the ram and abutment 64. During this compressing operation the cage is free to float or move upward so as to assure practically uniform pressure on all the cakes within the cage and reduce as much as possible discrepancies in pressure due to friction of the individual cakes against the inside walls of the cage. While the material within the cage is under compression by ram 52 the oil contained therein is forced from the cakes into the vertical channels 19 down which it flows into the basin or trough 24 from which latter it discharges through outlet 25 into vat 90.

During the operation of the apparatus the cages E are loaded with cooked meats at mechanism C and from said mechanism each loaded cage is transferred by means of turntable D to one of the extracting presses $A^1$, etc., where it remains for a period of time during which said extracting press is operated by successive increments of pressure to compress the contents of the cage so as to express the oil therefrom. The cage is then removed from the extracting press and transferred by turntable D to the stripping or unloading press B where it remains for another period of time during which said unloading press is operated to discharge the now "dry" caked material from the cage. After the unloading operation at press B the empty cage is shifted by turntable D to the loading mechanism C for refilling and the above series of operations are repeated. During the normal operation of the apparatus all of the seven cages E are in use, there being, for the greater part of the time, a loaded cage E in each of the extracting presses $A^1$, etc.; another cage at press B which is either empty or being unloaded, and another cage at mechanism C either loaded or being loaded. By providing two more cages E than there are extracting presses $A^1$, etc., it is possible always to have a loaded cage in each extracting press with its contents undergoing compression except during the interval of time that a cage is being transferred from one of the extracting presses to unloading press B and another loaded cage is being simultaneously transferred from loading mechanism C to said extracting press and an empty cage is being shifted from the unloading mechanism B to the loading mechanism C. Only about four minutes are required to make these transfers of three cages and during this time the remaining four presses $A^1$, etc., are expressing oil. When these transferring operations are carried out the cage at the extracting press that is to be transferred to unloading press B, the empty cage at the unloading press B and the freshly loaded cage at the loading mechanism C, are all three moved onto the turntable D after which the latter is revolved to transfer the cage from the extracting press to the unloading press, to deliver the empty cage to the loading mechanism and to deliver the freshly loaded cage to said extracting press.

The apparatus herein shown is particularly designed for extracting the oil from the meats of cotton seeds and in operating upon material of this kind it is necessary to leave the cages in the extracting presses for a considerable length of time and in order that the apparatus may be operated practically continuously to extract or express oil at its maximum capacity, I provide such a number of extracting press $A^1$, etc., that the operations of loading, transferring and stripping a cage may be continuously repeated without loss of time or interruption of the continuity of operation at maximum capacity.

In the expression of oil from cotton seed, the time during which the seed is under compression is about thirty-six minutes, of this time about thirty minutes is required, by gradual increments of pressure, to attain the maximum pressure of about four thousand pounds to the square inch. This pressure attained is held for a few minutes, to give time for the fullest practical expression of oil and the escape of the oil from the seed mass to the oil ducts, leading to the trough or catch basin.

My apparatus is designed systematically so that its various parts cooperate to the best advantage in the prime function of an oil expressing apparatus, namely, the maximum extraction of oil from the oil bearing material and in attaining, so far as may be continuity of operation of the apparatus. It is highly desirable, to this end, that the cooked material should be placed in the expressing press at a temperature not materially less than the maximum temperature necessary to properly cook the material to be acted upon, say 225° Fahrenheit. It is obvious that by the old hand methods of preparing the charge for the press, it was impossible to handle the charge at any but relatively low temperatures. Furthermore, by the older methods, the charge itself was not shaped nor of uniform density, the margin of the charge especially, being thin so that it received little or no compression and had either to be collected from the expressed cake and worked into a subsequent charge or, as was more common, went to waste. My mechanical cake forming and cage loading mechanism is designed to enable the cooked material to be operated upon at high temperatures, and at such temperatures to be formed of uniform size and shape and of substantially uniform density from centre to circumference and the finished cake deposited hot in a hot press cage and the maximum number of cakes so deposited.

The cake forming and cage loading mechanism is substantially automatic in operation and can be timed to suit the special requirements of a particular plant. A usual adjustment is to revolve the actuating ring gear $2^x$, eight revolutions per minute, which will produce eight cakes per minute, and, as each cage is designed to hold thirty cakes, it will be seen that a cage will be filled in about four minutes. These figures are given as approximate only, since on some substances and with some operating crews the speed may be greater. However, whatever the speed of cake production and cage loading, the other elements will be worked in conformity, for example, the cooker, if of the continuous type, which I prefer, will be adjusted to produce a supply of material sufficient to keep the cake former in constant operation and the presses will be in number sufficient to take care of the cake former production, as adjusted.

The former C occupies about four minutes in filling the first cage, which is then transferred to press $A^1$, which then begins expressing. Former C at the same time, by the same shifting movement of the connecting turntable having received an empty cage, begins the loading of the second cage, which is complete in four minutes, transferring then to press $A^2$, which begins expressing, former C at the same time, by the same shifting movement of the connecting turntable having received an empty cage, begins the loading of the cage, which is complete in four minutes and transferred to press $A^3$, and this cycle is continued until presses $A^1$, $A^2$, $A^3$, $A^4$ and $A^5$ have been loaded and set in operation. The sixth cage will be filled at the end of thirty-six minutes, and the cage $A^1$ will be removed and replaced by the newly filled cage, the expressed cage passing by a continuous movement to stripping press B, another empty cage being placed in former C. Thereafter, at the end of each four-minute filling operation, the cage will be drawn from an expressing press, onto the turntable, and an empty cage will be drawn from press B onto the turntable, and a filled cage will be drawn from the forming mechanism onto the turntable, and the operation of the turntable will carry the loaded cage from the former C to the expressing press, the "dry" cage from the expressing press to the stripping press and the empty cage from the stripping press B to the former C occupying about four minutes in the transfer of the three cages. The stripping press requires but about two minutes to perform its function, so that it is always ready to deliver and receive. The former C operates practically continuously and delivers a full cage before each operation of the turntable and receives an empty cage at the end of each operation of the turntable. The expressing press delivers a "dry" cage before each operation of the turntable and receives a full cage at the end of each operation of the turntable and the stripper press delivers an empty cage before each operation of the turntable and receives a "dry" cage at the end of each operation of the turntable, so that the sequence of operation for various elements of the mechanism is not interrupted and maximum efficiency and continuity of occupation for the laborers required, is attained.

I claim:—

1. An apparatus of the character described, comprising a turntable; a plurality of cages adapted to hold material to be operated upon; a cake-forming and cage-loading mechanism stationed adjacent said turntable; a plurality of presses stationed adjacent said turntable; mechanical means on said turntable for shifting the cages onto and off from said turntable.

2. An apparatus of the character described, comprising a turntable; a plurality of cages adapted to hold material to be operated upon; a cake-forming and cage-loading mechanism stationed adjacent said turntable; power driven means on said turntable for shifting the cages onto and off from said turntable, and manually operated means for controlling said shifting means.

3. An apparatus of the character described, comprising a turntable having a plurality of tracks to receive and position a cage; a plurality of cages adapted to hold material to be operated upon; a cake-forming and cage loading mechanism stationed adjacent said turntable and having tracks for receiving and positioning a cage, cooperating with the tracks upon the turntable; mechanical means on said turntable for shifting the cages on said tracks onto and off from said turntable.

4. In an apparatus of the character described the combination of an extracting press: a cage for holding material to be operated upon by said press, said cage being made at its lower end with a chamber for receiving the liquid extruded from the material by the press and with an outlet for said chamber; a normally closed valve controlling said outlet; means for automatically opening said valve when the cage is shifted into position within the press and for holding said valve open while the material within the cage is being operated upon.

5. In an apparatus of the character described, the combination of an open-ended cake-forming die mounted for movement; a cage arranged in operative relation with the movable forming die; means to eject successive cakes against a yielding plunger resistance through the open end of the die into a cage to uniformly compact and form each cake separately and to load the cage; a carraige movable in a fixed path and in operative relation with the cage to receive and shift the loaded cage; a plurality of presses in operative relation with the carriage to receive a cage therefrom and deliver a dry cage thereto.

6. In a cage for oil presses, a sleeve; one or more rings having an external periphery closely fitting the interior of the sleeve and each having an interior space to receive material to be pressed; an external groove around each ring, forming a space enclosed by the ring and the sleeve and a slot crosswise of said external groove registering with a similar slot in the adjacent ring, to connect said external grooves with each other and a source of heated fluid.

7. A cage, made up of an outer sleeve and a plurality of rings forced into the sleeve, each ring having an annular passage formed upon its outer side and one or more cross passages intersecting the annular passage and registering with a cross passage on an adjacent ring.

8. In an apparatus of the character described, a pressure plunger; a resistance block; a cage floating during the expressing operation by frictional engagement with its contents under pressure.

Signed at Atlanta, Georgia, this twenty-ninth day of October. 1920.

NELSON B. HENRY.